CASINGS FOR ALKALINE BATTERIES

Filed Oct. 21, 1966

United States Patent Office 3,441,447

Patented Apr. 29, 1969

3,441,447

CASINGS FOR ALKALINE BATTERIES

Stephen Ben Hartop, Maxstoke, near Coleshill, England, assignor to Joseph Lucas (Industries) Limited, Birmingham, England Filed Oct. 21, 1966, Ser. No. 588,399

Claims priority, application Great Britain, Oct. 27, 1965, 45,595/65

Int. Cl. H01m *1/02, 11/00*

U.S. Cl. 136—166 3 Claims

ABSTRACT OF THE DISCLOSURE

A casing for an alkaline battery comprising a plurality of identical parts interengaged to define the cells of the battery and which further define integral valves for controlling admission of electrolyte to the cells.

This invention relates to casings for alkaline batteries.

A casing according to the invention comprises a plurality of parts which are interengaged to define the cells of the battery and which define integral valves for controlling admission of electrolyte the cells.

Figure 1:
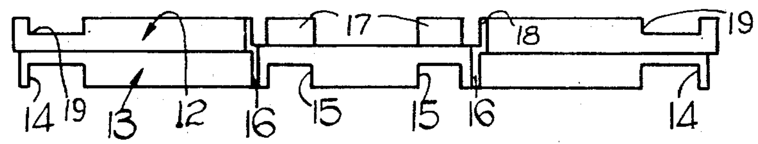
Figure 2:
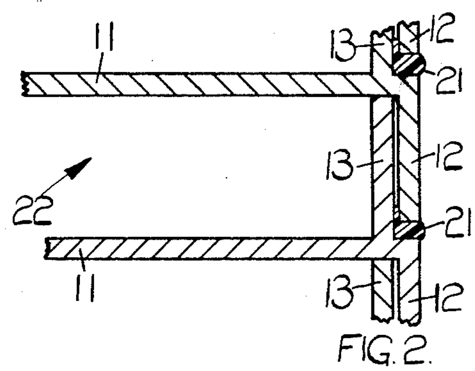
Figure 3:
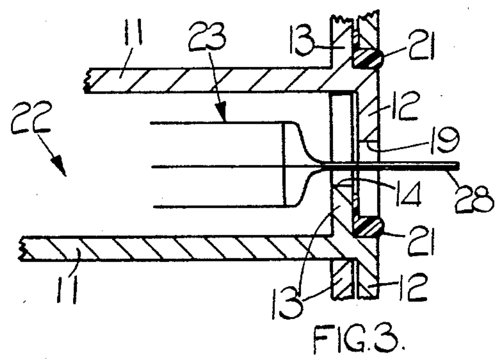
Figure 4:
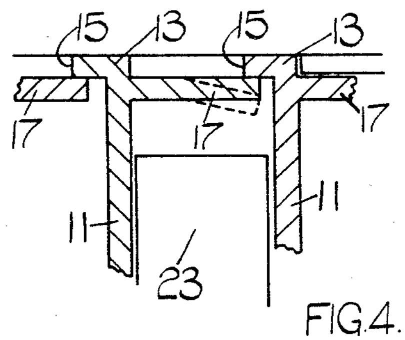
Figure 5:
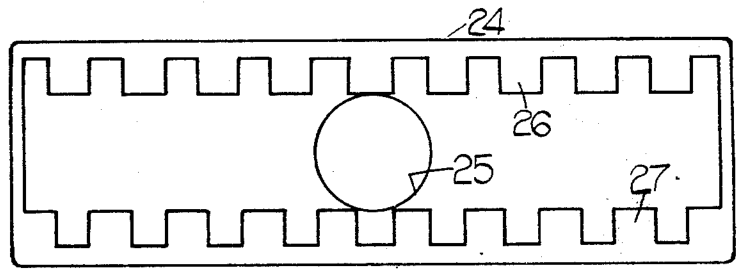
Figure 6:
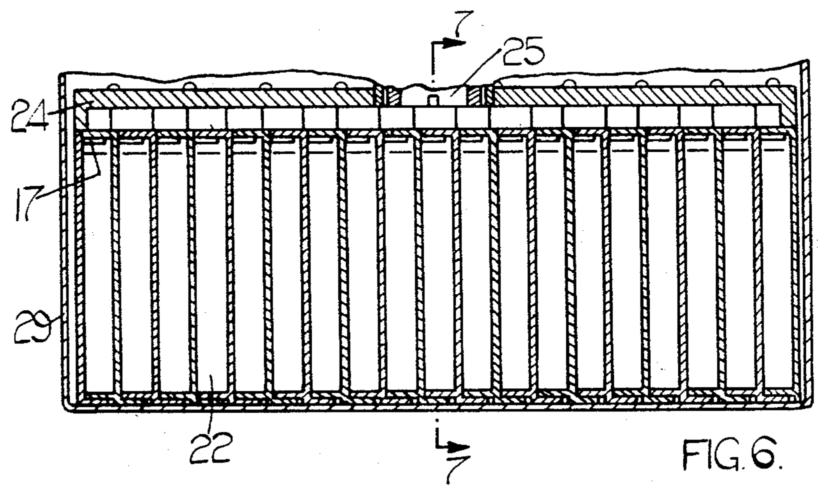
Figure 7:
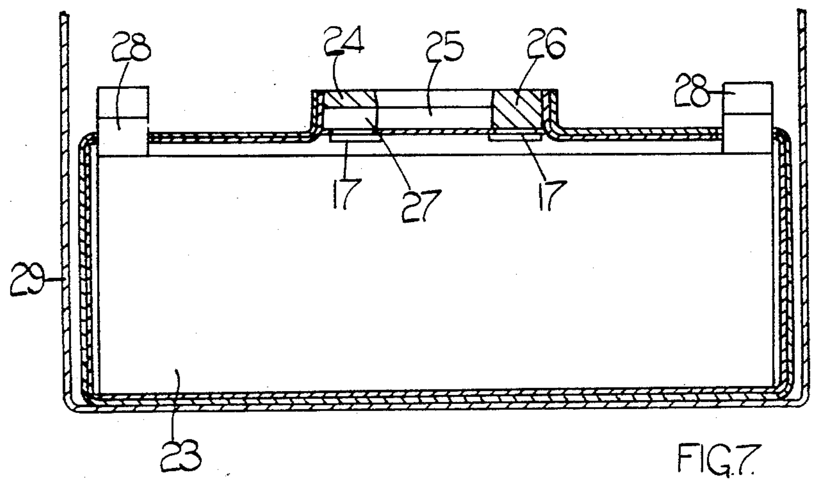

An example of the invention is illustrated in the accompanying drawings, in which FIGURE 1 is a view of the top edge of one of a plurality of mouldings from which the battery casing is formed, FIGURES 2 and 3 respectively are sectional views showing the interconnection of a pair of mouldings, FIGURE 4 is a sectional view through an integral filling valve, FIGURE 5 is an inverted plan view of a manifold used in the battery, FIGURE 6 is a sectional view of an assembled battery the assemblies of battery plates being omitted for clarity, and FIGURE 7 is a sectional view on the line 7—7 in FIGURE 6.

Referring to the drawings, the battery casing is built up from a number of identical parts each of which is moulded to define a plate 11 having a wall 12 extending outwardly in one direction from its periphery, and a second wall 13 extending outwardly in the other direction, the wall 13 being slightly inset from the periphery and having a height greater than the height of the wall 12. On the upper edge of the plate, the wall 13 is shaped as shown in FIGURE 1 to define a pair of slots 14 at the ends of the wall, pair of slots 15 on opposite sides of the middle of the wall, and a pair of upstanding lugs 16 adjacent the slots 15 and between the slots 15, 14. The wall 12 is shaped to define a pair of tongues 17 opposite, and slightly wider than the slots 15 the tongues 17 being set back with respect to the slots 15 by a distance equal to the thickness of the wall 13. The wall 12 further defines a pair of upstanding lugs 18 which are integral with the lugs 16 but nearer the sides of the plate 11, and a pair of slots 19 opposite the slots 14, the remainder of the walls 12, 13 being continuous.

When the moulded parts are interengaged, they assume the positions shown in the sectional views 2, 3 and 4. FIGURE 2 is a section through one side of the casing indicating how the walls 12, 13 overlap and are cemented together as indicated at 21 to define a cell 22. In each cell is placed an assembly 23 of battery plates, the leads 28 from the plates extending through the passage defined by adjacent slots 14, 19 in a pair of parts as shown in FIGURES 2 and 7. The leads 28 are in the form of conductive straps which are interconnected externally of the battery casing to provide the usual intercell connections.

The tongues 17 close the slots 15 as shown in FIGURE 4, but are sufficiently flexible to permit the introduction of electrolyte into the cell under pressure until the pressures on opposite sides of the tongues 17 become equal. Thus, the moulded parts serve to define integral valves for controlling filling of the cells with electrolyte.

The lugs 16 define a pair of guides between which is engaged a filling manifold 24 (FIGURES 5 to 7). The manifold has a central hole 25 through which the electrolyte is introduced, and two rows of lugs 26, 27. The lugs 26 block off the valves in alternate cells on one side of the casing, whilst the lugs 27 block off the valves in the intervening cells on the other side of the casing. Thus, although two valves are defined in each cell, only one is used, and adjacent cells have their valves at opposite sides of the battery, so providing a long electrolyte path between adjacent cells.

The mouldings for the ends of the battery can be the same as the other mouldings, or can have one of the walls 12, 13 removed.

The assembled battery is conveniently housed in an outer casing 29, which also houses an electrolyte reservoir (not shown).

The invention is not limited to arrangements in which the mouldings are identical and could, for example, be applied to a construction in which each cell is defined by a pair of mouldings which are mirror images of each other.

Having thus described my invention what I claim as new and desire to secure by Letters Patent is:

1. A casing for an alkaline battery comprising a plurality of identical parts which are interengaged to define the cells of the battery and which define integral valves for controlling admission of electrolyte to the cells, each of said parts being molded to define a plate, which defines one of the sides of said cell, said plate having at each end a first wall extending outwardly in one direction from its periphery, and a second wall extending outwardly in the other direction, said second wall being inset from said periphery and having a height greater than the height of said first wall; said two walls overlapping when interengaged to define the upper and lower walls of said cells; the upper edges of said plates being shaped to define a series of openings into said cells and a series of flexible tongues which close said openings when the pressure on the interior side of said tongue is equal to or greater than the pressure on the exterior side of said tongues and which open said openings when the pressure on the exterior side of said tongues is greater than the pressure on the interior side thereby coacting to control the admission of electrolyte to said cells.

2. A casing as claimed in claim 1 wherein the parts further define members for engaging and locating a manifold shaped to close some of the valves and direct electrolyte to the remaining valves.

3. A casing as claimed in claim 1 wherein the parts are shaped to define apertures through which, in use, leads extend to battery plates housed within the cells.

References Cited

UNITED STATES PATENTS 2,942,053 6/1960 Baldwin et al. ---- 136—143 XR

WINSTON A. DOUGLAS, *Primary Examiner.*

D. L. WALTON, *Assistant Examiner.*

U.S. Cl. X.R.

136—162